United States Patent
Langlois

(10) Patent No.: US 10,513,312 B2
(45) Date of Patent: Dec. 24, 2019

(54) SYSTEM FOR ATTITUDE CONTROL AND STABILIZATION OF A WATERCRAFT

(71) Applicant: Joseph R. Langlois, Pompano Beach, FL (US)

(72) Inventor: Joseph R. Langlois, Pompano Beach, FL (US)

(*) Notice: Subject to any disclaimer, the term of this patent is extended or adjusted under 35 U.S.C. 154(b) by 0 days.

(21) Appl. No.: 16/375,453

(22) Filed: Apr. 4, 2019

(65) Prior Publication Data
US 2019/0225303 A1 Jul. 25, 2019

Related U.S. Application Data

(63) Continuation-in-part of application No. 15/617,365, filed on Jun. 8, 2017, now Pat. No. 10,315,737, which is a continuation-in-part of application No. 14/997,244, filed on Jan. 15, 2016, now abandoned.

(51) Int. Cl.
| | |
|---|---|
| *B63B 1/28* | (2006.01) |
| *B63B 1/26* | (2006.01) |
| *B63B 1/24* | (2006.01) |
| *G05D 1/08* | (2006.01) |
| *B63B 39/06* | (2006.01) |

(52) U.S. Cl.
CPC ............ *B63B 1/286* (2013.01); *B63B 1/248* (2013.01); *B63B 1/26* (2013.01); *B63B 39/061* (2013.01); *G05D 1/0875* (2013.01)

(58) Field of Classification Search
CPC ............ B63B 39/061; B63B 1/20; B63B 1/22
See application file for complete search history.

(56) References Cited

U.S. PATENT DOCUMENTS

| | | | | |
|---|---|---|---|---|
| 4,909,175 | A * | 3/1990 | Arneseon | B63B 39/061 |
| | | | | 114/285 |
| 7,188,581 | B1 * | 3/2007 | Davis | B63B 39/061 |
| | | | | 114/285 |
| 9,573,655 | B1 * | 2/2017 | Pigeon | B63B 1/20 |
| 9,643,697 | B2 * | 5/2017 | Sheedy | B63B 1/26 |
| 9,669,903 | B2 * | 6/2017 | Gasper | B63B 1/242 |
| 9,694,873 | B2 * | 7/2017 | Gasper | B63B 1/32 |
| 9,802,684 | B2 * | 10/2017 | Sheedy | B63B 35/85 |
| 10,035,571 | B1 * | 7/2018 | Langlois | B63B 39/061 |
| 2017/0137089 | A1 * | 5/2017 | Wood | B63B 1/22 |

(Continued)

*Primary Examiner* — Lars A Olson
*Assistant Examiner* — Jovon E Hayes
(74) *Attorney, Agent, or Firm* — Melvin K. Silverman

(57) ABSTRACT

A system and method involving hydro-lifters for achieving attitude and control of a watercraft including at least one elongate planar surface, at least one actuator mounted to the hull of the watercraft and pivotally connected to a planar surface. The system using at least one containment shelf-bracket fastened to the underside of the hull forming a non-fixed containment area, between an upper surface of the containment shelf-bracket and the hull, to capture the planar surface and provide a support surface on which the planar surface may rest and allowing forward, aft, and vertical slidability of the planar surface. A method for calculating optimal surface area of the planar surfaces for fuel efficiency by obtaining the measurements of an overall length of the hull and maximum beam of the hull, multiplying the measurement, multiplying the value by 1-3%, and dividing the resulting number by the quantity of planar surfaces.

26 Claims, 12 Drawing Sheets

(56) References Cited

U.S. PATENT DOCUMENTS

2017/0203820 A1\* 7/2017 Langlois ............... B63B 39/061
2017/0253306 A1\* 9/2017 Langlois ............... B63B 39/061
2017/0320553 A1\* 11/2017 Langlois .................. B63B 1/32

\* cited by examiner

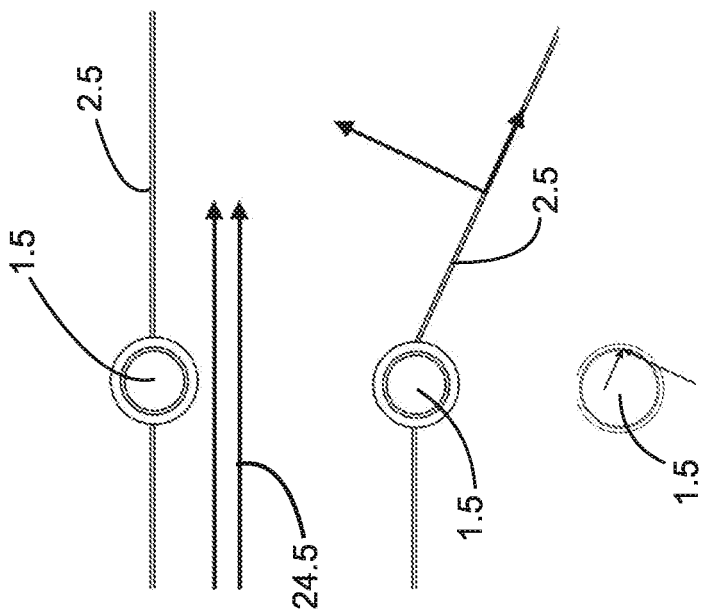
FIG. 7 (PRIOR ART)
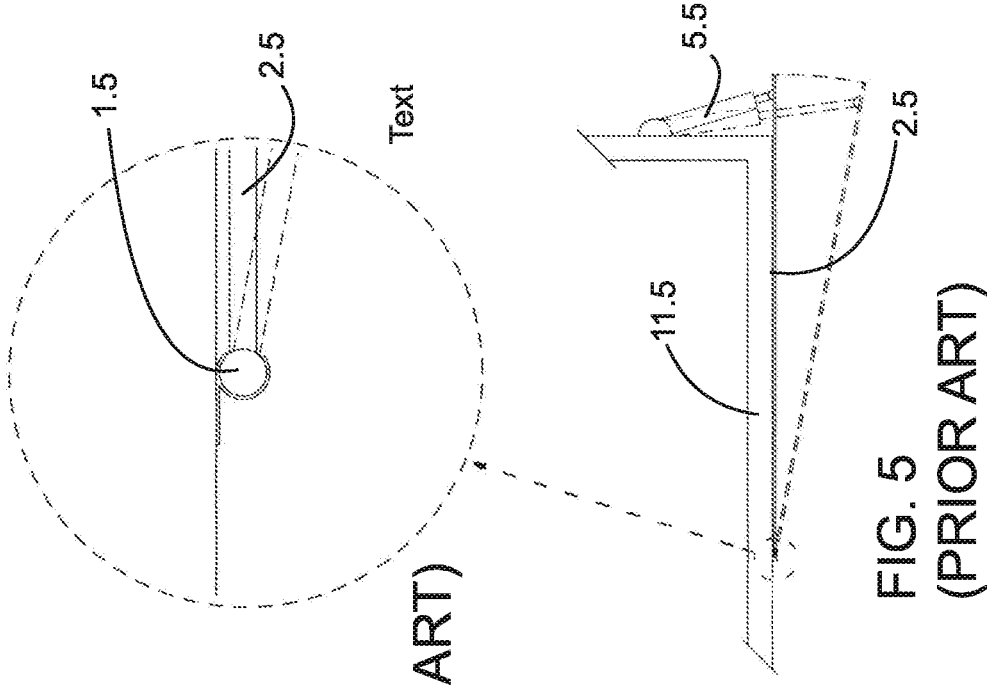
FIG. 6 (PRIOR ART)
FIG. 5 (PRIOR ART)

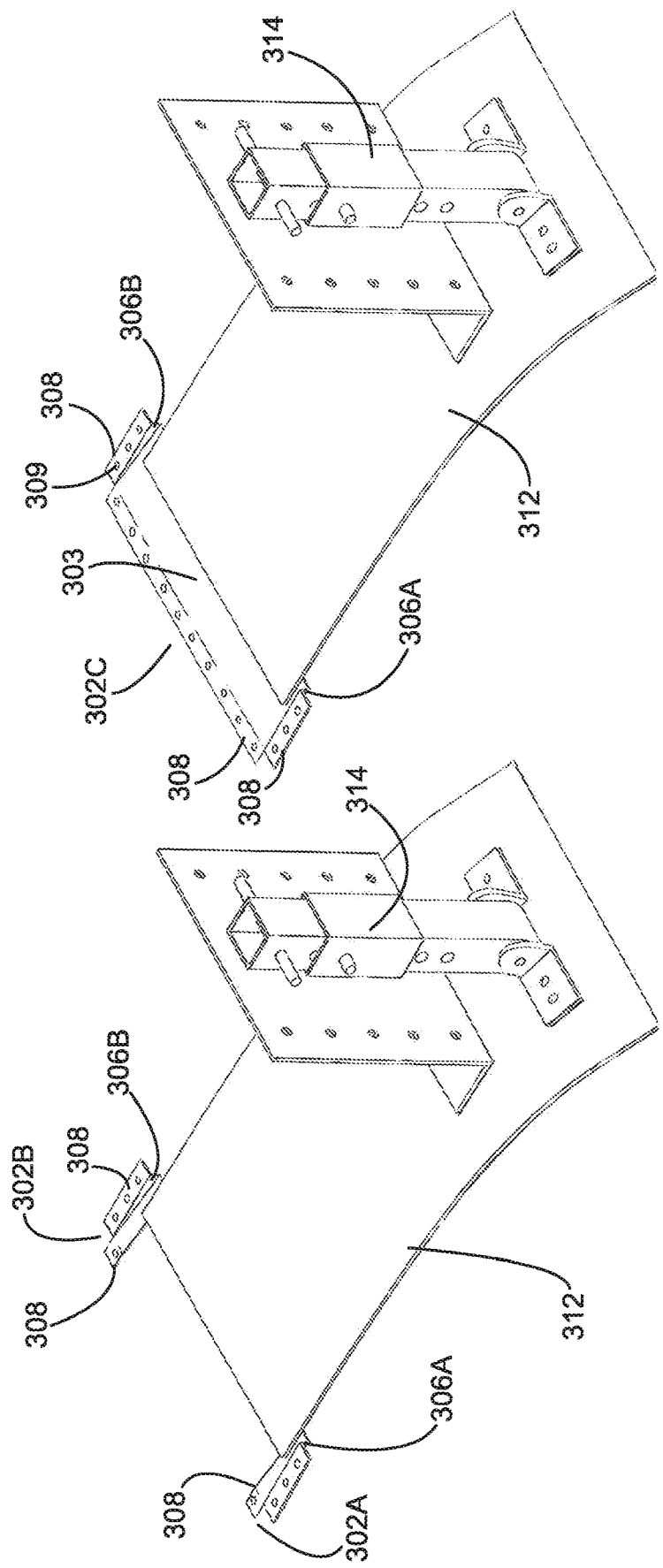

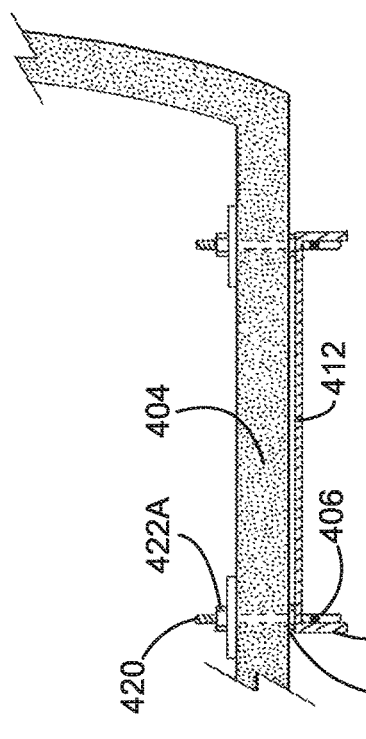
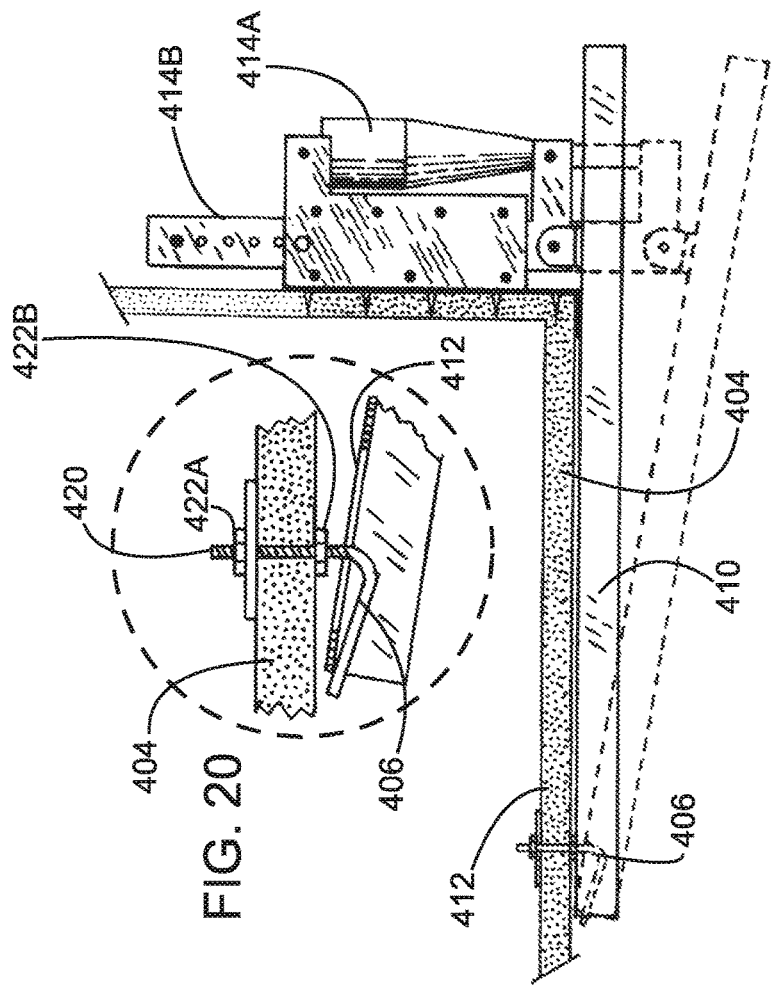

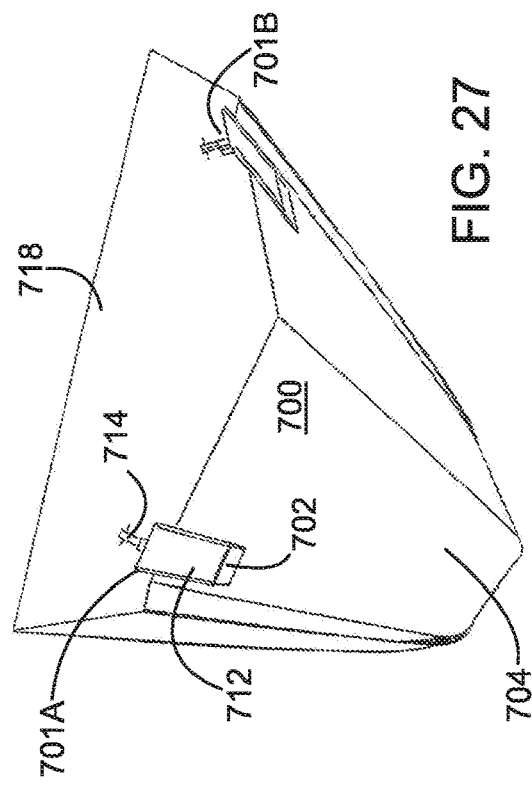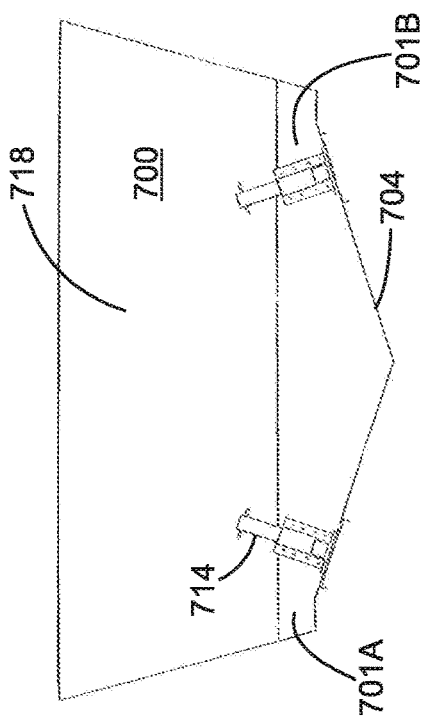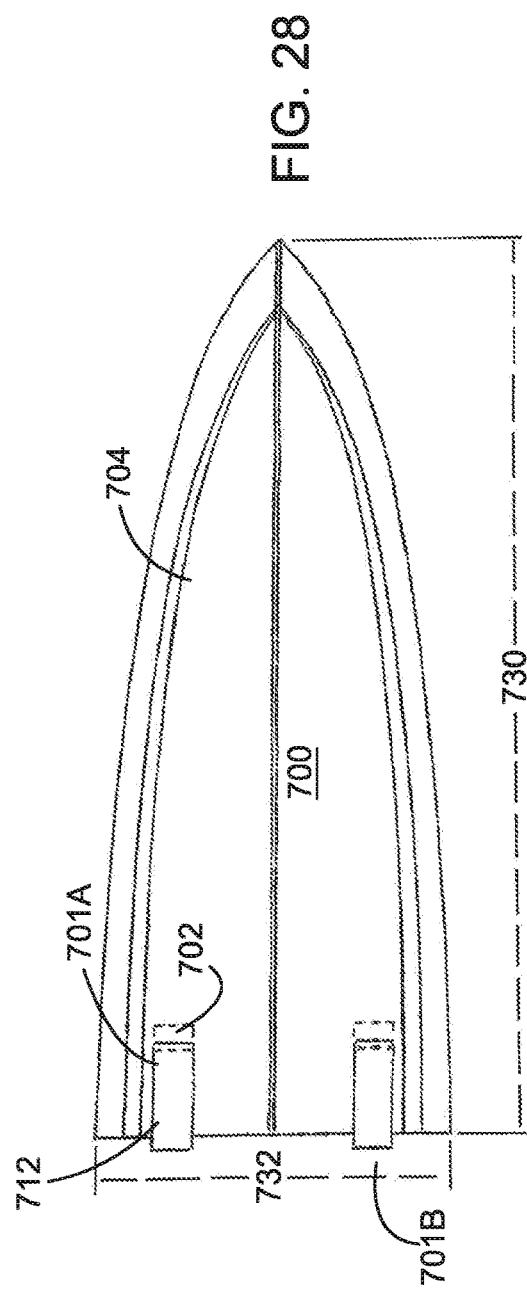

SYSTEM FOR ATTITUDE CONTROL AND STABILIZATION OF A WATERCRAFT

CROSS REFERENCE TO RELATED APPLICATIONS

This application is a continuation-in-part of application Ser. No. 15/617,365, filed Jun. 8, 2017, which is a continuation-in-part of patent application Ser. No. 14/997,244, filed on Jan. 15, 2016, now abandoned. All prior patent applications are herein incorporated by reference in their entirety.

FIELD OF THE INVENTION

The present invention relates to an improvement in classical trim tab and stern flap technology to enhance the general hydrodynamic performance of a watercraft inclusive of the fuel efficiency thereof.

BACKGROUND OF THE INVENTION

So-called watercraft leveling devices of the trim tab type have been known for many years and various forms of them have been developed in an effort to maximize attitude control, stability of the watercraft and general hydrodynamic efficiency inclusive of decrease of flow velocity under the hull and fuel efficiency.

The prior art trim tabs which typically are provided in pairs to enhance stability of the craft, is shown in FIGS. 1, 2, 3 and 4 herewith. More particularly, FIG. 1 shows a traditional external trim tab 2.1 of which is attached directly to transom 3.1 of a craft 100.1 and in which the attitude of the trim tab is controlled through a hydraulic piston assembly 4.1 which controls relative angulation of the hull relative to level of the water. Also shown in FIG. 1 is a servo-loop wiring 9.1 by which assembly 4.1 are controlled.

The prior art shown in FIG. 2 differs from that of FIG. 1 only in that the trim tab 2.2 is positioned beneath stern 6.2 of the craft 100.2 and forward of propeller 8.2. Therein, the direction of assembly 4.2 and hydraulic piston 5.2 are aligned with the gravity vector as opposed to the angled position of the hydraulic assembly shown in the prior art of FIG. 1.

The prior art shown in FIG. 3 demonstrates the hinge common in most trim tabs, that is, a pivot hinge 1.3 that fastens the planar surface 2.3 of the trim tab to the watercraft. The pivot hinge is fixed in a specific location, and requires an actuator 5.3, mounted at a non-right angle to allow the planar surface to.

FIGS. 5, 6, and 7 show a trim tab with fixed hinge point, as known in the prior art. As noticed, hinge 1.5 connects the planar surface 2.5 to the hull 11.5 by way of a pin hinge 1.5, wherein two leaves of two brackets are coupled by use of a pin 1.5. FIG. 6 is an enlarged view or FIG. 5 showing the hinge in greater detail. FIG. 7 shows the hydrodynamic forces 24.5 of water flowing against the planar surface 2.5. Noticed is that the force of the water pushes up and against the planar surface. This puts a strain on the hinge at higher speeds, when the actuator 5.5 is extended and the rear of the planar surface 2.5 is in its descended position. There will also be force acting on the pin connection 2.5 of the hinge from gravity when the watercraft is at rest.

The prior art shown in FIG. 4 shows a similar issue where the planar surface 2.4 is fastened directly to the hull of the watercraft by a living hinge 7.4. This living hinge 7.4 is in a fixed location as well, and thus requires an actuator 5.4 mounted at a non-right angle, or the actuator 5.4 with a pivot mount to allow the planar surface 2.4 of the trim tab to descend.

In general trim tabs of the prior art, whether double or single acting, will operate upon the same principles and have a common objective, namely, that of contributing to the efficiency control of the watercraft's attitude, stabilization and general hydrodynamics.

There are significant differences between the prior art and the current invention. Primarily, the use of a living hinge as in the prior art of Arnseson U.S. Pat. No. 4,909,175 and Weiler, U.S. Pat. No. 3,463,109, do not allow an extent of slidability for the trim tabs it connects. Arnseson uses a living hinge 7.4, which is a thin flexible hinge made from the same material as the two rigid pieces it connects. Weiler uses a pin hinge 1.3, which allows its trim tab 2.3 to raise and descend, but is limited to pivoting around its connection point. Thus, there exists a need for a fluid-hinge to allow slidability of the trim tab it connects.

In recent years, most efforts of the prior art have been directed primary to improvement of the electronics and the development of algorithms to optimize trim tab control under various conditions of vehicle speed, wave conditions, shape of the watercraftt's hull, having distribution in craft, and other hydrodynamic considerations. The prior art also has experimented with the efficiency of electric motor controls of the trim tabs as opposed to that of the hydraulic systems shown in FIGS. 1 and 2. In general, the durability of electric motor controls has proven to be superior to that of hydraulic actuators.

The U.S. Navy has undertaken significant research and development in this area to attempt to maximize performance of a variety of its watercrafts and, typically, of the types employed by the U.S. Coast Guard. In Navy terminology, a trim tab is referred to as a stern flap, apparently because its engineering objectives are more ambitious than are the case with a leisure class powerboat. More particularly, the Navy has identified the following criteria as hydrodynamic mechanisms which account for improved watercraft performance based on optimized stern flap design.

After body flow modifications:
Flow velocity under the hull decreased.
Pressure recovery increased.
Transom exit velocity increased.
Wave system modifications:
Localized transom system wave system altered.
Near field wave heights reduced.
Far field wave energy reduced.
Secondary stern flap hydrodynamic effects:
Ship length increased.
Beneficial propulsion interactions.
Ship trim modified (bow down trim induced).
Ship sinkage is reduced.
Lift and drag forces developed on flap.

The within inventor has recognized that the fundamental objectives and benefits of trim tabs and stern flaps may be more effectively achieved if the entire length of the trim tabs or stern flaps are extended. And that, when properly actuated and controlled, such elongated attitude control element, as suggested can accomplish and substantially improve upon the performance of prior art trim tabs and stern flaps regardless of hydrodynamic conditions. The efficiency of the present invention may be yet further improved the assistance of contemporary electronic controls and algorithms. The present invention also improves upon efforts that seek to improve the performance of trim tabs thereof through modification of their geometry as, for example, is reflected in U.S. Design Pat. No. 292,392 (1987) to Zepp, entitled Boat Leveler Twin Tab; U.S. Pat. No. 6,038,995 (2000) to Karafiath et. al, entitled Combined Wedge-Flap; and U.S. Pat. No. 3,092,062 (1963) to Savitsky entitled Mechanical Control for Submerged Hydrofoil Systems.

SUMMARY OF THE INVENTION

The instant invention relates to a system of hydro-lifters for achieving a desired attitude and control of a watercraft. The system includes at least one elongate planar surface disposed substantially in parallel with a bow-to-stern axis of a bottom of a hull of a watercraft, and at least one actuator mounted to the hull of the watercraft, the actuator pivotally connected at a distal end to a rear portion of the planar surface. Further provided is at least one containment shelf-bracket fastened to the underside of a hull of a watercraft forming a non-fixed containment area, between an upper surface of containment shelf-bracket and the hull of a watercraft, to capture the planar surface and provide a support surface on which the planar surface may rest and allowing forward, aft, and vertical slidability of the planar surface, thereby forming a fluid-hinge. The system further includes the at least one planar surface having a total sum of surface area of all of said at least one planar surfaces of said hydro-lifters of 1%-3% of the product of multiplying the overall length of the hull of the watercraft and the maximum beam of the hull of the watercraft.

Also provided is a method for calculating optimal surface area of the planar surfaces of the hydro-lifters for fuel efficiency comprising the steps of obtaining the measurement of an overall length of a hull of a watercraft, obtaining a measurement of maximum beam of a hull of a watercraft, calculating an optimal surface for area for at least one planar surface of at least one hydro-lifter by obtaining a first value by multiplying the measurement of overall length of the hull of the watercraft by the maximum beam of the hull of the watercraft, and obtaining the optimal surface area for at least one planar surface of at least one hydro-lifter by multiplying the first value by 1-3% and dividing the resulting number by the quantity of planar surfaces.

It is accordingly an object of the present invention to provide an improvement over current trim tab systems, and overcomes the various hydrodynamic limitations of the prior art, the same having utility with leisure as well as naval vessels.

It is another object of the invention to provide a hydro-lifter system capable of inducing a greater change in bow-to-stern or glide angle angulation of the watercraft relative to the water level while increasing the fuel efficiency thereof.

It is a yet further object to provide a system of the above type which furnishes improved accuracy of adjustment versus prior art trim tab stern flap systems.

It is a further object to provide a system of the above type having utility in improved performance of watercraft whether used in a single or double hydro-lifter context.

It is a still further object to provide a system to improve the degree and control of the glide angle of the watercraft and its ability to correct uplift zones to facilitate a more favorable weight distribution, each resulting in reduced fuel costs.

Yet further, the present invention also seeks to reduce the need for submersible flow interceptors as they are know in the art.

Still further, the present invention therefore seeks to provide more effective trimming coupled with the greatest possible uplift and lowest water resistance values, both at slow and high speeds, in a manner that does not substantially complicate the kinematics of prior art attitude control systems.

The present invention also seeks to increase efficiency of removing and replacing a trim tab, or hydro-lifter, for various reasons including replacement and cleaning, by allowing the user to disconnect the actuator from the planar surface, and slide the planar surface out of the capture of the fluid-hinge, and thereby lessening time-consumption and damage to the watercraft or hydro-lifter due to removal as a result.

The above and yet other objects and advantages of the present invention will become apparent from the hereinafter set forth Brief Description of the Drawings, Detailed Description of the Invention and Claims appended herewith.

BRIEF DESCRIPTION OF THE DRAWINGS

FIG. 5 is a schematic view of a trim tab system as is typical in the art.

FIG. 6 is an enlarged view of the hinging element in FIG. 5.

FIG. 7 is a set of diagrams showing the hydrodynamic forces acting on the system shown in FIG. 5.

FIG. 17 is a top perspective view of an embodiment of the hydro-lifter system with two clips of a pocket-style fluid-hinge and a flexible planar surface.

FIG. 18 is a top perspective view of an embodiment of the hydro-lifter system with a pocket-style fluid-hinge and a flexible planar surface.

FIG. 19 is a side schematic view of a hydro-lifter system with a bent prong for containing the planar surface.

FIG. 20 is an enlarged view of the hinging element as shown in FIG. 19.

FIG. 21 is a cross-sectional stern view of the mounting system of the hydro-lifter illustrated in FIG. 19.

FIG. 26 is a stern view of a watercraft with two hydro-lifters.

FIG. 27 is a bottom perspective of the watercraft as shown in FIG. 25.

FIG. 28 is a bottom view of a hull of a watercraft showing the beam and length measurements of the hull.

DETAILED DESCRIPTION OF THE INVENTION

Figure 1:
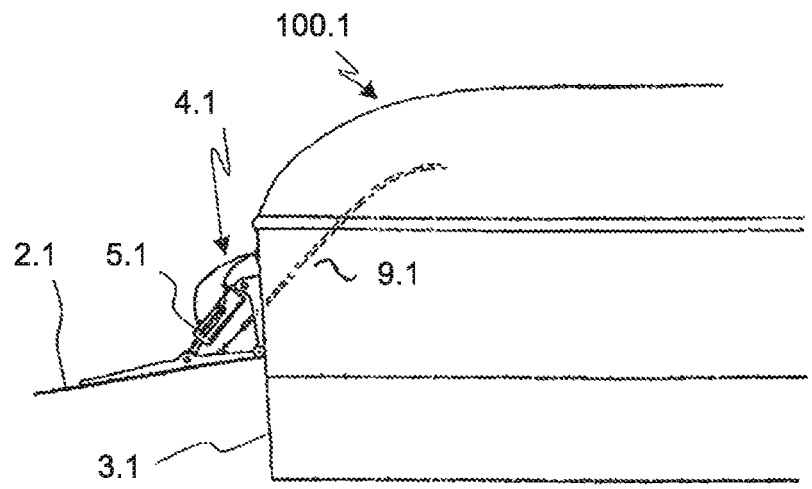
FIG. 1 is a schematic view of one form of prior art trim tab system
Figure 2:
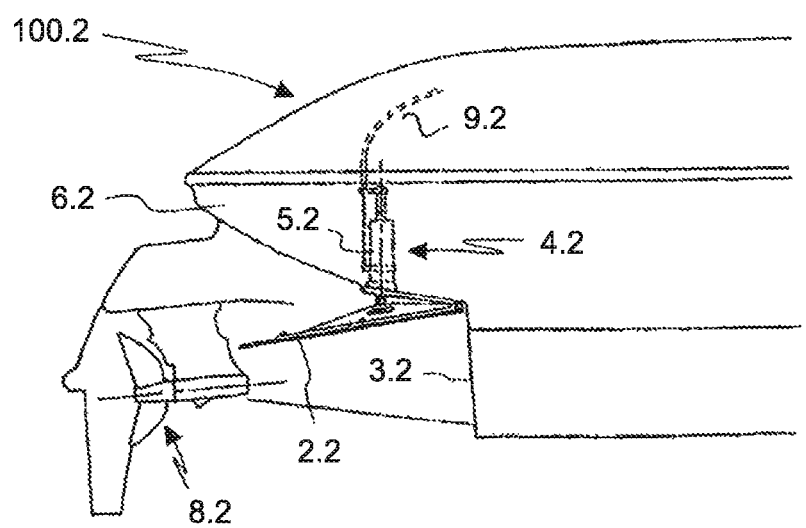
FIG. 2 is a schematic view of a second form of prior art trim tab system.
Figure 3:
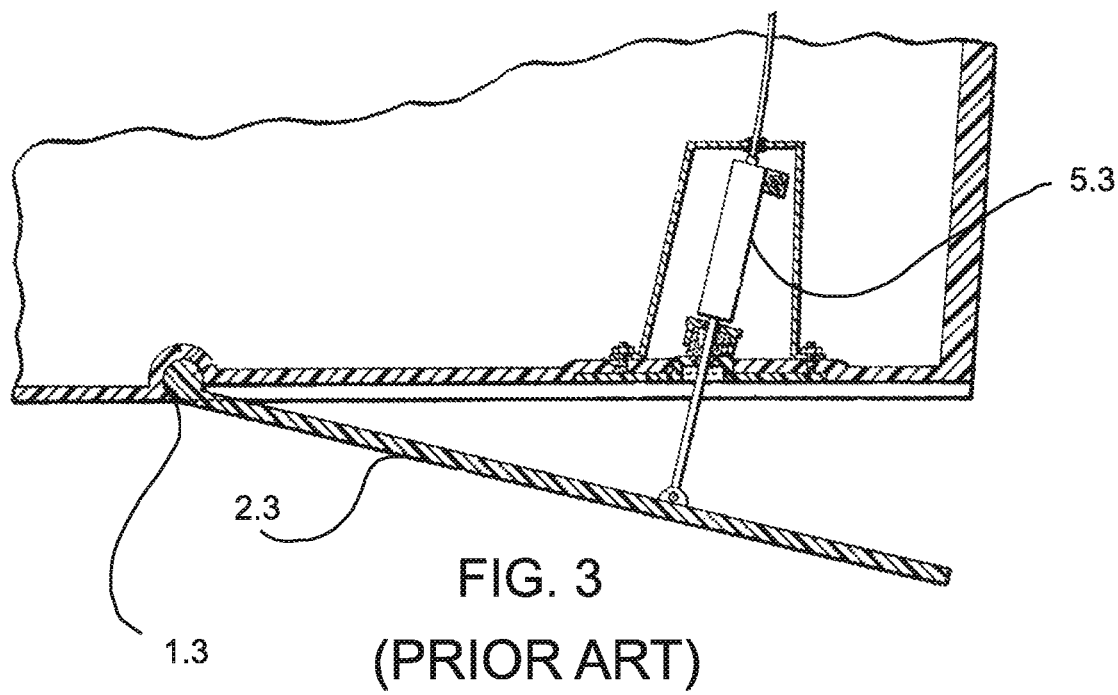
FIG. 3 is a schematic view of a third form of prior art trim tab system.
Figure 4:
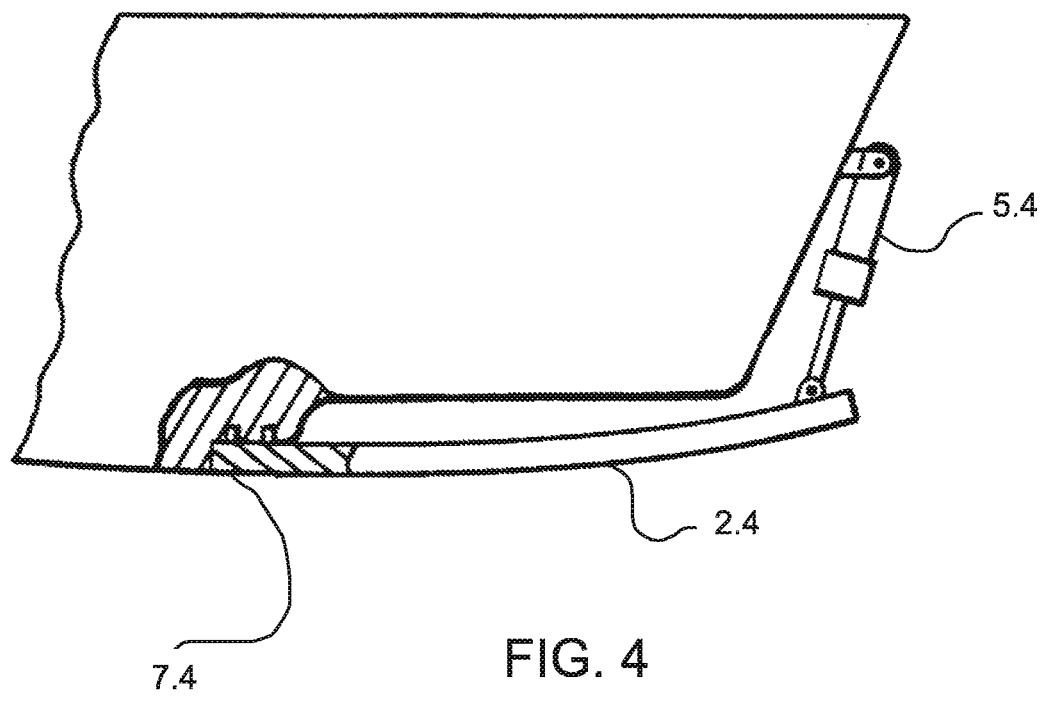
FIG. 4 is a schematic view of a fourth form of prior art trim tab system.

The disclosed invention provides a system of hydro-lifters to achieve desired attitude control of a watercraft and provides for optimized efficiency through use of particular dimensional requirements. The hydro-lifters act similar in operation to trim tabs, but typically will exist larger watercrafts and are much larger than traditional trim tabs. Further, hydro-lifters are used to raise the stern and bring down the bow of the ship, to provide for a more level movement. The system exists through use of a three-part arrangement of an actuator, a planar surface, and a fluid-hinge.

The actuator can either be electric, mechanical, electro-mechanical or manual in operation. In an ideal embodiment, the actuator will be mounted to the transom of a watercraft, but may also exist in a sleeved containment internally within the hull of a watercraft. The actuator will also be pivotally connected to the rear end of the planar surface of the hydro-lifter, allowing the rear portion of the planar surface to descend when the actuator is elongated in a downward position, and allow the planar surface to rest about parallel to the hull of a watercraft when the actuator is in its shortened state.

The planar surface can be either substantially rigid or flexible. Rigid planar surface may be made of metallic, carbon fiber, fiberglass, or similar materials. However, there are some embodiments that may be made of flexible materials, or provide a degree of flexibility. The size of the planar surface will depend on the size of the watercraft. To provide for the optimum level of efficiency, the surface area of the planar surface should be calculated by measuring the maximum beam of the watercraft and maximum length of the watercraft. Once these measurements are obtained, the total surface area needed is generated by multiplying the value of the maximum beam by the maximum length, and taking the product of this calculation and multiplying it by a value in the range of one percent (0.01) to three percent (0.03). This range provides for issues where available surface area of the hull of a watercraft may affect mounting area the size of the surface area of the hydro-lifter. Available surface area for mounting may also affect the number of hydro-lifters needed. In most applications of the hydro-lifters to the hull of the watercraft, two hydro-lifters will be provided; one for a port side, and one for a starboard side. For use with two hydro-lifters, the surface area calculated will be divided by two, and each planar surface of the hydro-lifter system will provide for half of the total necessary surface area. Likewise, for systems that use one lifter, the surface area will be applied to the one planar surface. For systems using three planar surfaces, the surface area will be divided by three and each planar surface will provide one third of the necessary surface area. This model can be applied to systems with any number of planar surfaces.

The planar surface will interact with the forces from the water under the watercraft and provide the lift necessary to raise the stern of the watercraft and allow the front to sink at higher speeds keeping the ship level. This increases the efficiency, including fuel efficiency of the watercraft. Too much of a surface area of the planar surface will unnecessarily increase drag and reduce efficiency, and too little surface area will not provide enough lift to raise the stern of the watercraft.

At rest and at low speeds, a watercraft operator will want to keep the actuator in its shortened state so that the rear of the planar surface rests about parallel to the watercraft and does not create any unnecessary drag. At higher speeds, an operator will want to extend the actuator in its elongate state to drop the rear of the planar surface, creating an angle between the planar surface and the hull of the ship, which lifts the stern up and drops the bow to keep the watercraft level.

Another important aspect of this invention is the hinging mechanism, known as a fluid-hinge. A fluid-hinge is a two-part system in and of itself, comprised of a containment capture, known as a containment shelf-bracket, and a planar surface. The fluid-hinge acts like a hinge, allowing the planar surface to maintain a radial movement ability, but does not fix the hinge point as current hinges do. The fluid-hinge accomplishes this by providing a capture mechanism that acts like a shelf to support the planar surface from having the front end descend beyond a certain point at low or no speeds when the force of the water does not push the planar surface up against the hull. However, the containment capture does not have a fixed connection to the planar surface and allows the planar surface to move and slide as the force of the water affects the planar surface, and as a result of an angulated planar surface where the actuator has pushed the rear of the planar surface down. The containment capture may take many forms, but can be a bracket that forms a pocket, or a piece of material, such as a rod, that allows the planar surface to rest. In tank tests performed at Davidson Laboratory at Stevens Institute of Technology in New Jersey, the inventor has modeled conditions with both a fixed hinge and a fluid-hinge, and has found the fluid-hinge to produce better results for efficiency in many instances. The fluid-hinge also allows for the use of a fixed actuator that is not pivotally connected to the transom.

Another major benefit of the fluid-hinge is its use in ease of replacement of a planar surface. Because the relationship between the planar surface and the containment area is non-fixed, a user simply has to detach the planar surface from the actuator, or detach the actuator from the transom, and let the planar surface slip out from the containment area. This is significant because current trim tabs are either fixed to a hinge, or directly fixed to the hull, which takes significant time to detach, and may damage the hull of the watercraft to replace. This also reduces the time needed for maintenance and cleaning.

Figure 8:
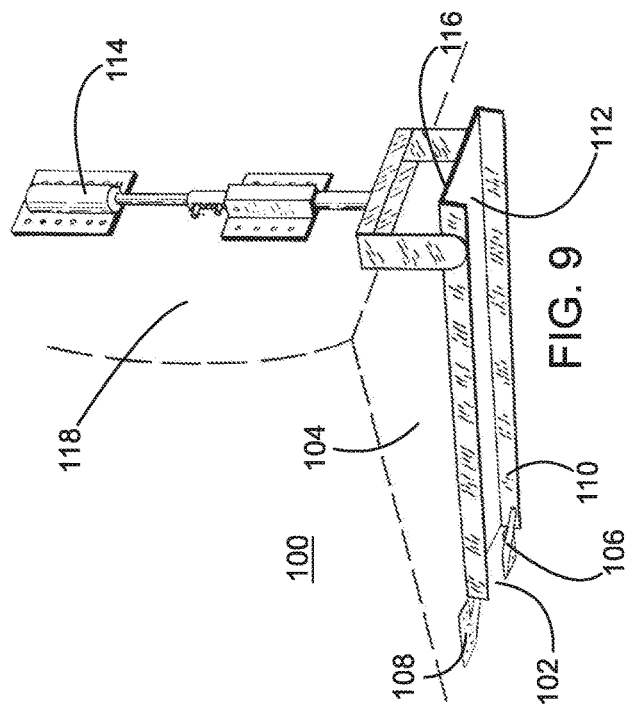
FIG. 8 is a bottom perspective of an embodiment of a hydro-lifter using two containment shelf-brackets using vertical ears.
Figure 9:
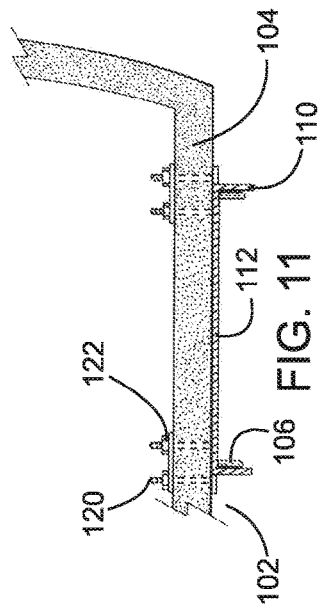
FIG. 9 is a bottom perspective of an embodiment of the hydro-lifter in FIG. 8, with shown with the actuator in its elongated state and the rear of the hydro-lifter in a descended position.
Figure 10:
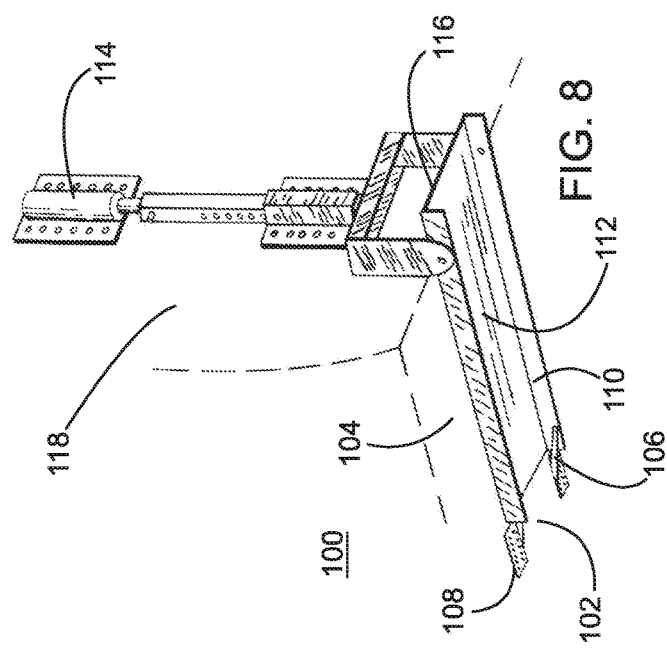
FIG. 10 is a stern end view of the hydro-lifter illustrated in FIG. 8.

FIGS. 8, 9, 10, and 11 show a system that use two containment shelf-brackets 102 mounted to the hull 104 of a watercraft 100, wherein vertical ears 106 extend downward direction from mounting brackets 108 and abut the inner structural walls—also called linear-support tabs 110— of a planar surface 112 of a hydro-lifter system. The vertical ears 106 rest against linear-support-tabs 110, but are not physically coupled together. Instead, the hinge provides support for the planar surface 112 at rest as shown in FIG. 8 to keep the planar surface 112 from descending below a plane parallel to the horizon of the hull. When the watercraft 100 is moving, the pressure of the water against the planar surface 112 pushes it up against the hull 104, thus negating the need for a fixed hinge. An actuator 114 connects the rear of the planar surface 116 to the transom 118 of the watercraft. This actuator is used to raise and descend the rear of the planar surface 116. Said system can be actuated from a raised position, as shown in FIG. 8, to a descended position, as shown in FIG. 9, by way of an actuator 114 shown in FIGS. 8, 9, and 10. FIG. 9 shows an isometric view from the rear of the watercraft of the planar surface 112 of the hydro-lifter system dipped at an angle below the plane parallel to the horizon of the hull 104. It can bee seen that the rear of the planar surface 116 is descended downward from the hull 104 of the watercraft 100.

Figure 11:
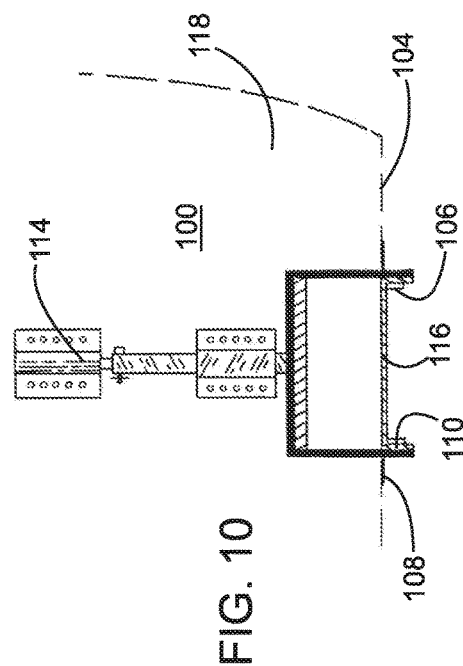
FIG. 11 is a cross-sectional stern-end view of the mounting system of the hydro-lifter illustrated in FIG. 8.

FIG. 11 further shows the mounting of the containment shelf-brackets 102. A series of bolts 120 secure the containment shelf-brackets 102 to the hull 104 and are secured by a series of nut 122 inside the hull 104. Noticed is elements 122, 120, and 102 do not physically couple the containment shelf-brackets to the substantially planar surface 112 or its sidewalls 110, but abut the side walls of the planar surface.

Figure 12:
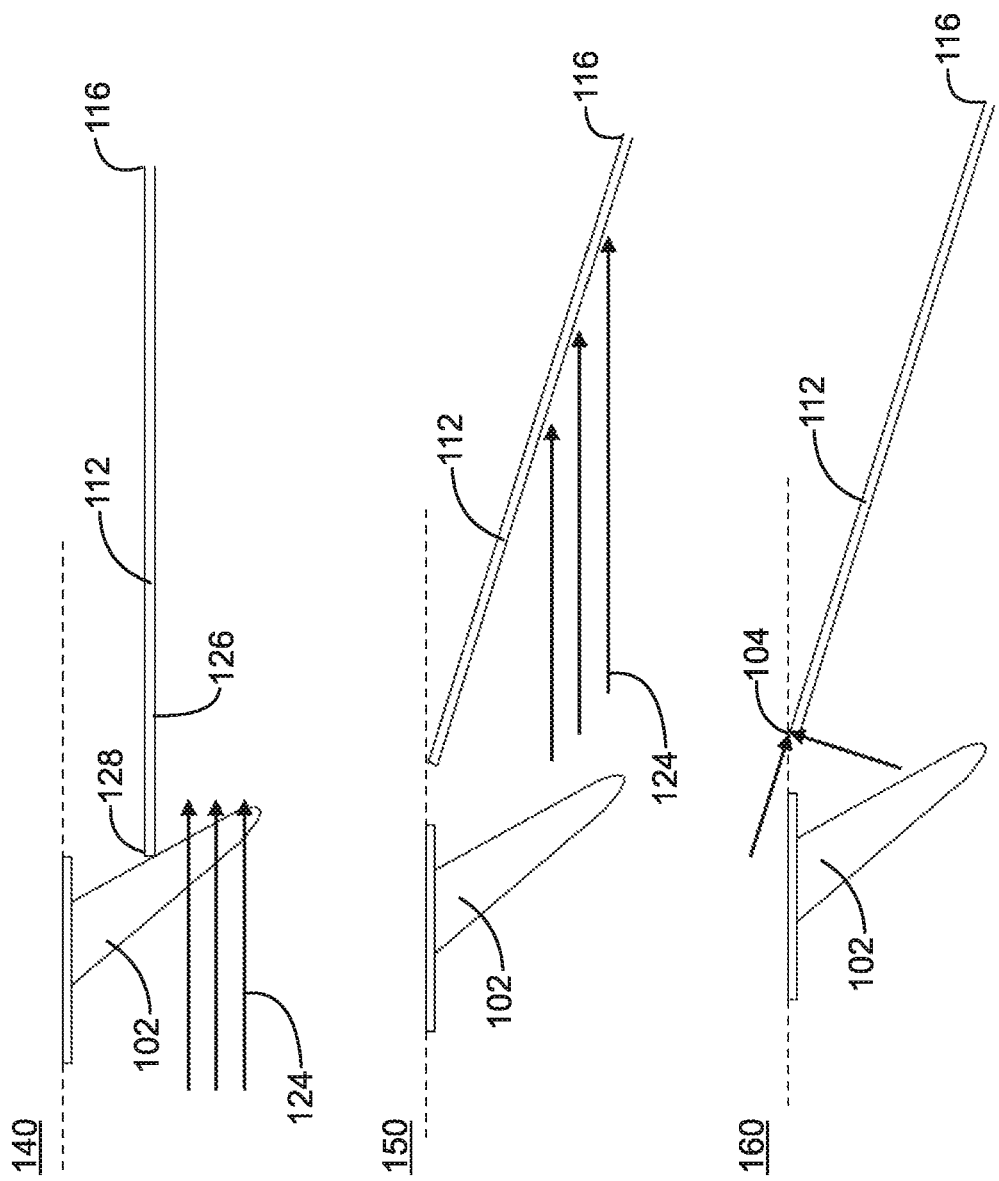
FIG. 12 is a set of diagrams showing the hydrodynamic forces acting on the system shown in FIG. 8.

FIG. 12 shows the result of descending the rear 116 of the planar surface 112 by elongating the actuator. Hydrodynamic forces 124 can be seen in frame 140 to pass parallel to the planar surface 112. When the rear 116 is descended, the hydrodynamic forces 124 act against a lower surface 128 of the planar surface 112. This forces the forward portion 128 of the planar surface 112 up. As noticed in frame 160, the forces on the forward portion of the planar surface 112 are not acting upon the containment shelf-bracket 102, but are instead acting upon the hull 104, either directly or upon an optional protective surface. The hydrodynamic forces 124 shown in frame 150 push against the planar surface, which will result in a raise in the stern-portion of the watercraft.

Figure 14:
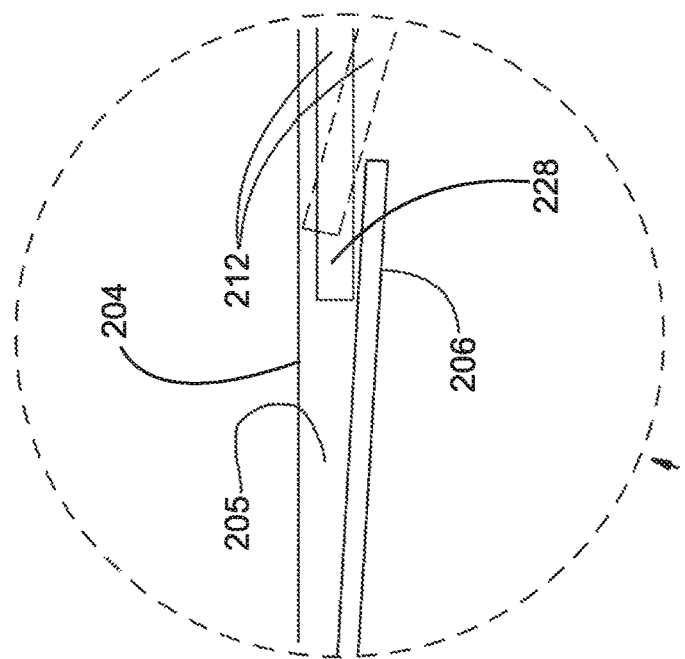
FIG. 14 is an enlarged view of the hinging element in FIG. 13.
Figure 13:
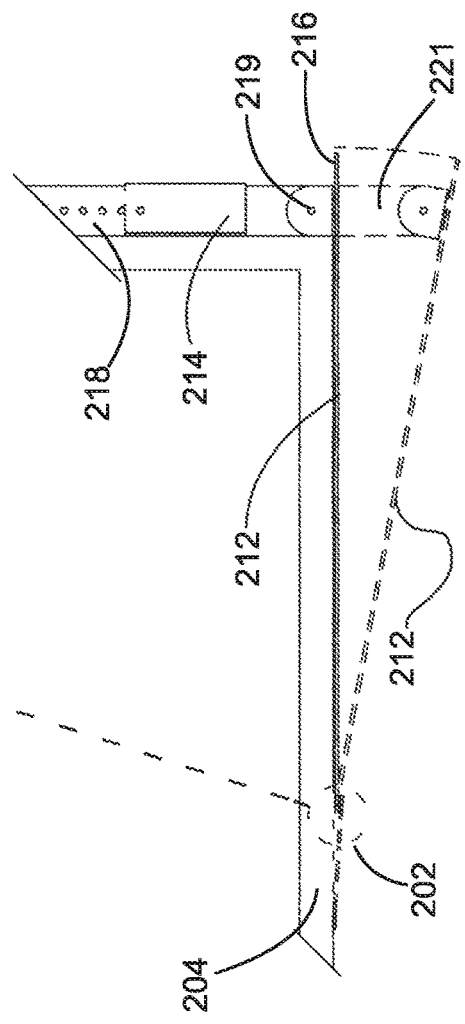
FIG. 13 is an embodiment of the hydro-lifter system using a pocket-style containment shelf-brackets.

FIG. 13 shows a side-schematic view hydro-lifter system using a containment shelf-bracket 202 to create a pocket 205, shown in FIG. 14, to capture the planar surface 212. The actuator 214 is also shown in FIG. 13, wherein the actuator 214 is mounted to the transom 218 of the watercraft. The bottom portion of the actuator 219 can be shown to be pivotally connected to the planar surface 212 at a rear portion 216 of said surface. Shown in dashed lines is a descended state of the system. FIG. 14 is an enlarged view of the fluid-hinge aspect of the system. The pocket 205 is created between a surface 206 of the containment shelf-bracket 202, and the hull 204 of the watercraft, which the planar surface 212 may rest on. The containment of the pocket can be seen from the planar surface 212 and the dashed lines showing the planar surface when the actuator is in its elongated state 221. Notice how when the planar surface 212 is descended, the pocket still acts as a containment to keep the forward-end 228 of the planar surface 212 from falling.

Figure 15:
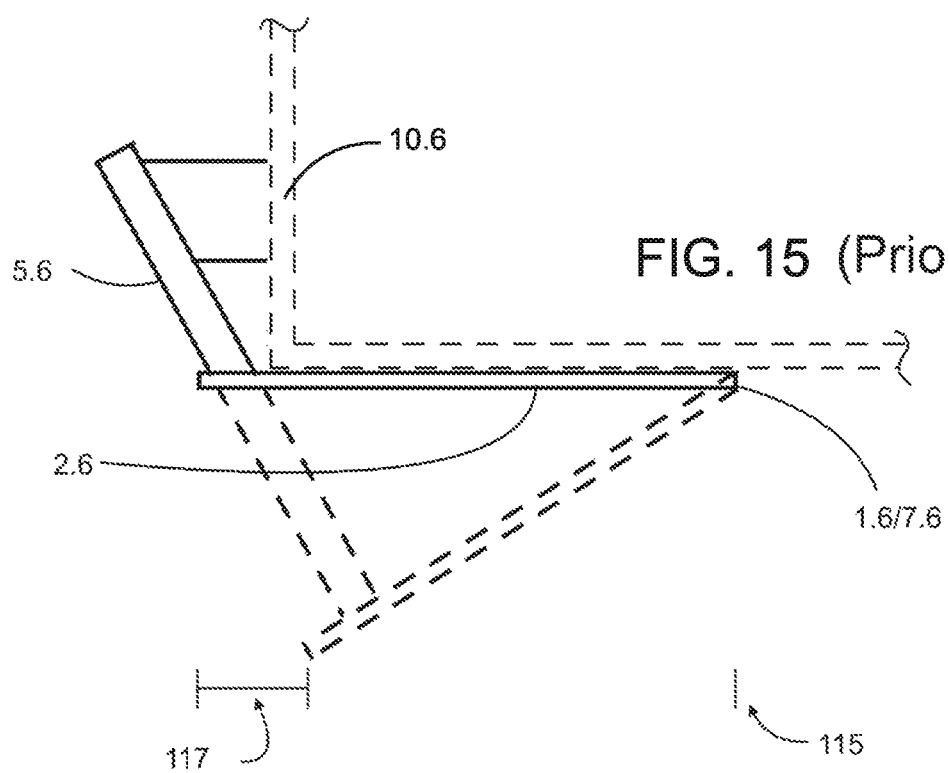
FIG. 15 is a side schematic view of a trim tab system, as known in the art, with fixed hinge point.
Figure 16:
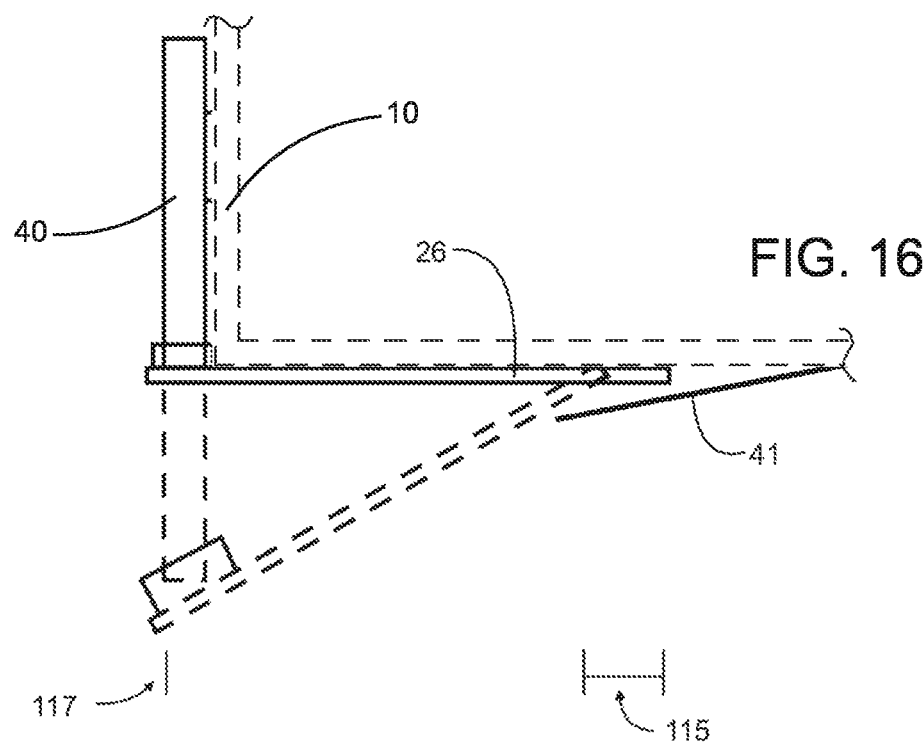
FIG. 16 is a side schematic view of a hydro-lifter system with a fluid-hinge.

FIGS. 15 and 16 illustrate the differences between a system using a fixed hinge, such as those in prior art and the systems disclosed in this invention. FIG. 15 shows movement as would be typical in a system of the prior art. The actuator 5.6 in the prior art systems cannot be fixed-mounted parallel to the transom 10.6. Instead, a fixed-mounted actuator would need to be mounted on an angle. Most actuators of the prior art are mounted using a non-fixed actuator, which allows the actuator to be pivotally connected at the connection to the transom and the connection to the planar surface. FIG. 16 shows the movement of a system as necessary for this invention. The fluid-hinge's containment shelf-bracket 41, allows the planar surface 26 to move and slide. As noticed, the system also uses an actuator 40 fix-mounted to the transom 10 of the watercraft. A main difference between the two systems is the movement of the planar surface. The planar surface of prior art uses a fixed hinge point 1.6/7.6, and when the actuator is elongated, the location of the rear of the planar surface moves to a position in a forward directional x-distance 117. However, the hydro-lifter in the present invention will not have a planar surface with a rear moving forward, but will instead have a forward portion of the planar surface move aft directional x-distance 115.

FIGS. 17 and 18 illustrate a system similar to that in FIGS. 13 and 14. FIGS. 17 and 18 are shown in an embodiment with a flexible planar surface 312. FIG. 17 shows the system with a mechanical actuator 314, flexible planar surface 312, and two clip-like pocket-style containment shelf-brackets 302A and 302B. These containment shelf-brackets have side walls 306A and 306B, facing an opposing containment shelf-bracket wall. The distinction between the embodiment shown in FIG. 17 and FIG. 18, is the lack of a continuous surface 303 as shown in FIG. 18. Both embodiments use at least one pocket-style containment shelf-bracket 302A and 302B or 302C mounted to the underside of a hull of a watercraft to capture the planar surface 312 in a non-fixed, non-coupled way. Both contain a supporting walls 306A and 306B to keep the planar surface 312 from moving too far laterally, and mounting brackets 308 where openings 309 can be used in securement to the hull.

Shown in FIGS. 19, 20, and 21 is a system with a power actuator 414A, mechanical actuating means 414B, planar surface 412 with linear support tabs 410, and a fluid-hinge involving a bent rod 406 with threaded portion 422 connecting the rod 406 to the hull 404, and fastened to the hull 404 of the watercraft by use of a threaded top nut 422A and bottom nut 422B. The rod 406 faces the bow of the watercraft and is bent slightly towards the hull 404. This orientation keeps the planar surface 412 of the hydro-lifter from dipping below the plane parallel to the horizon of the hull 404 of the watercraft a low speeds and rest. The hinge is not physically coupled to the planar surface 412. FIG. 19 is a schematic side-view of the hydro-lifter system. FIG. 20 is an enlarged view of the fluid-hinge-element of the system. FIG. 21 is a stern cross-sectional view of the mounting of the system through the hull 404 of the watercraft.

Figure 23:
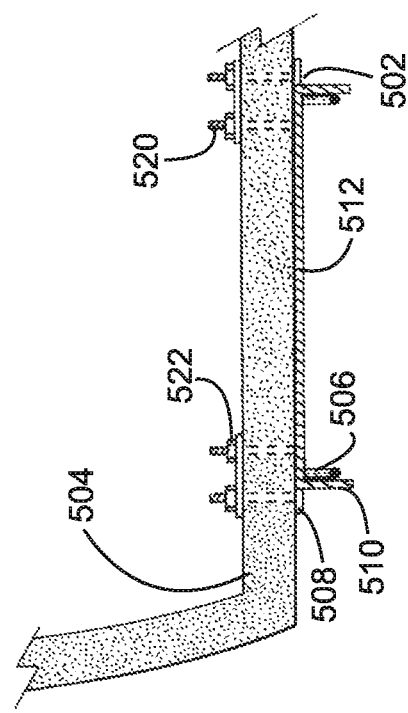
FIG. 23 is a cross-sectional view of the mounting system of the hydro-lifter as shown in FIG. 22.
Figure 22:
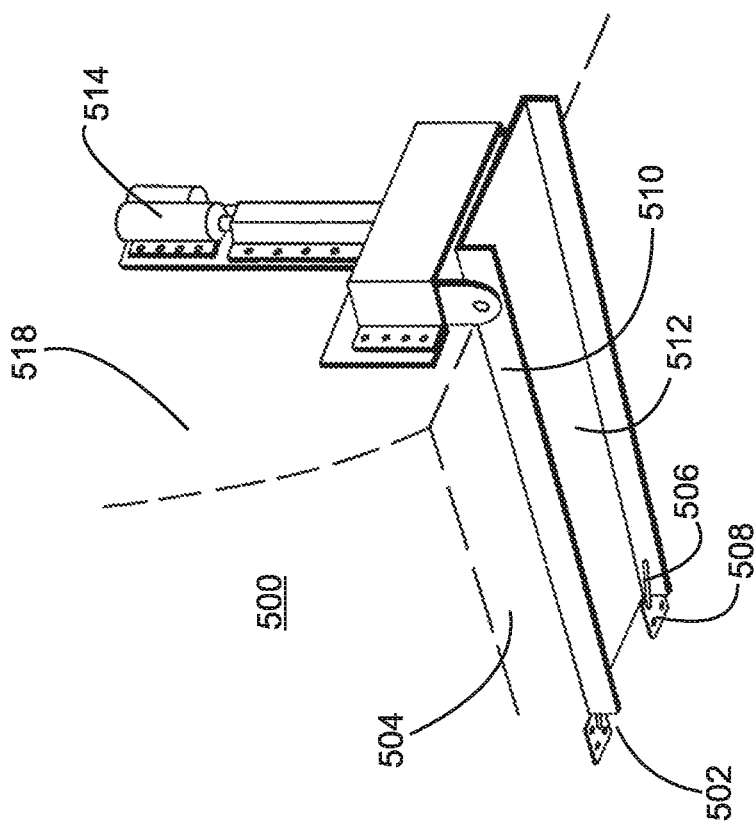
FIG. 22 is a bottom perspective of a hydro-lifter system with two containment shelf-brackets using angulated rods.

FIGS. 22 and 23 show a system wherein the containment shelf-brackets 502 are secured to the underside of the hull 504 of a watercraft 500. A rod-element 506 protrudes from a mounting bracket 508. The rod 506 keeps the planar surface 512 of the hydro-lifter system from dipping below the plane parallel to the horizon of the hull 504 of the watercraft a low speeds and rest. The rod in FIGS. 22 and 23 act like the vertical ears 106 from the embodiment shown in FIGS. 8-11. The rods 506 abut the side walls of the linear support tabs 510, but do not form a fixed connection. The containment shelf-bracket 502 is not physically coupled to the planar surface 512. This non-fixed connection allows the actuator 514 to be mounted against the transom 518 of the watercraft 500, wherein the actuator 514 can elongate without the need for a fixed hinge at the forward portion of the planar surface 512. The actuator 514, as shown, can be seen to mount to the sidewalls of the linear support tabs 510, to allow for an unencumbered upper surface of the planar surface 512.

FIG. 23 further shows the mounting of the containment shelf-bracket 502. A series of bolts 520 secure the containment shelf-brackets 502 to the hull 504 and are secured by a series of nuts 522 inside the hull 504. Noticed is elements 506, 508, 522, and 520 do not physically couple the containment shelf-brackets 502 to the substantially planar surface 512 or its sidewalls 510, but abut the side walls of the planar surface.

Figure 24:
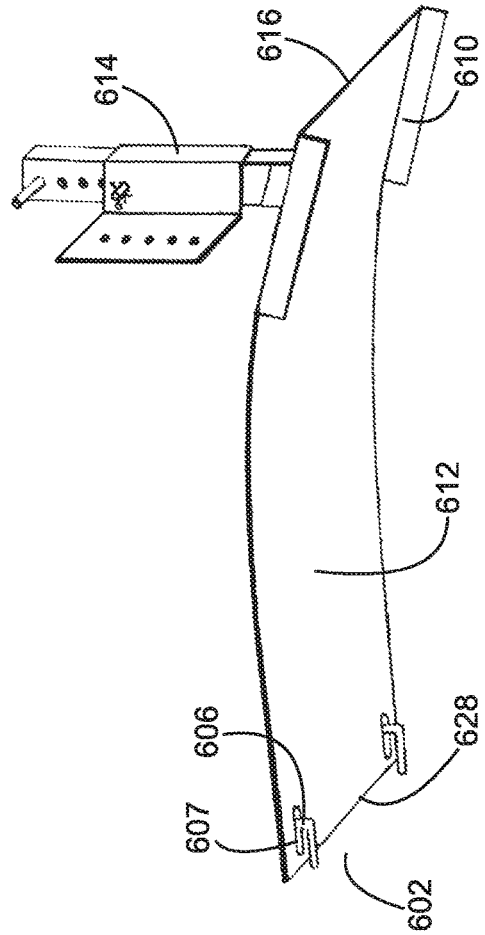
FIG. 24 is a bottom perspective of a hydro-lifter system with flexible planar surface using a containment shelf-bracket using bent prongs.

FIG. 24 shows a system using a manual actuator 614, a flexible planar surface 612, and a containment shelf-bracket 602 with bent rods 606 connected to the hull 604 of the watercraft. The containment shelf-bracket 602 is used to secure the flexible surface 612. The rods 606 work as a support surface, life a shelf, allowing the planar surface 612 to be secured to the hull 604, but not physically coupled. The rods 606 extend through a hole 607 of the planar surface 612 to keep the planar surface 612 secured, but allows the planar surface 612 to move freely when an actuator 614 pushes down on the rear 616 of the planar surface 612. The containment shelf-bracket 602 also keeps the front of the planar surface 628 from dipping below the plane parallel to the horizon of the hull 604 of the watercraft when the watercraft is at low speeds or rest. This embodiment of the system is similar to the configuration shown in FIGS. 19-21.

Figure 25:
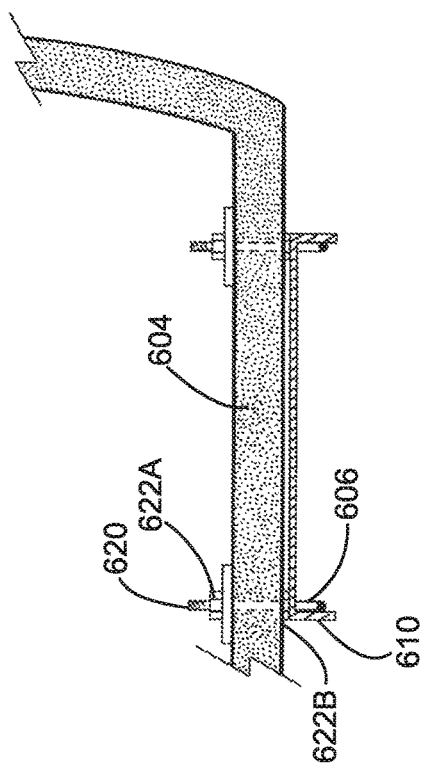
FIG. 25 is a cross-sectional stern view of the mounting system of the hydro-lifter illustrated in FIG. 24.

FIG. 25 further shows the mounting of the containment shelf-brackets. A threaded rod 620 runs through to the hull 604 and is secured by a nut 622A inside the hull 604 and a nut 622B outside the hull 604. Noticed is elements 620, 622A, and 622B do not physically couple the rod 606 to the flexible surface 612, but fits in a hole 607 provided for the rod 606 to fit through, and further allows the flexible surface 612 to rest at low or no speeds.

FIGS. 26, 27, and 28 show the system using two hydro-lifters 701A and 701B; one mounted to a port side, and one mounted to a starboard side. FIG. 26 is a stern view showing the hydro-lifters 701A and 701B, including the transom 718, and transom-mounted actuator 714. FIG. 27 is an bottom-view perspective of the watercraft 700 of FIG. 26. Noticed in FIG. 27 are also containment areas 702, and planar surfaces 712, as well as the actuators 714.

FIG. 28 further shows the watercraft 700 of FIGS. 26 and 27, but also indicates the overall length 730 of the watercraft 700, and maximum beam 732 of the watercraft, used in calculation of the optimal surface area for fuel efficiency. This surface area can be applied by obtaining the measurement of an overall length 730 of the hull 704 of the watercraft 700, obtaining a measurement of maximum beam 732 of the hull 704 of the watercraft 700. The calculation can be made by multiplying the value of the maximum beam by the value of the maximum length, then multiplying that value by a number between 0.01 and 0.03. The number chosen can depend on how much actual space is available under the hull, for instance, a watercraft with less available area under the hull may require a value closer to 1% of maximum beam multiplied by maximum length, whereas a watercraft with more available space may have a value closer to 3% of maximum beam multiplied by maximum length. This is the overall needed surface area. For instance, if there are two hydro-lifters with two total planar surfaces, than each planar surface will need to be one-half of the total necessary surface area.

Each embodiment shown in FIGS. 8-14 and 16-28 keep the planar surface of the hydro-lifter from dipping below the plane parallel to the horizon of the hull of the watercraft at low speeds and rest, but the hinge mechanisms are not physically coupled to the planar surface.

Each embodiment shown can use any actuating means, including electric, mechanical, electromechanical, manual, and hydraulic actuators. Illustrations are for reference and conceptualization purposes only, and should not be limiting to the embodiments shown with the actuators.

While there has been shown and described above the preferred embodiment of the instant invention it is to be appreciated that the invention may be embodied otherwise than is herein specifically shown and described and that, within said embodiment, certain changes may be made in the form and arrangement of the parts without departing from the underlying ideas or principles of this invention as set forth in the Claims appended herewith.

I claim:

1. A system of hydro-lifters for achieving a desired attitude and control of a watercraft, the system comprising:
at least one elongate planar surface of a hydro-lifter disposed substantially in parallel with a bow-to-stern axis of a bottom of a hull of a watercraft;
at least one actuator mounted to the hull of the watercraft;
said at least one actuator pivotally connected at a distal end of said at least one actuator to a rear portion of the planar surface;
at least one containment shelf-bracket fastened to the underside of a hull of a watercraft; and
said at least one containment shelf-bracket forming a non-fixed containment area, between an upper surface of containment shelf-bracket and the hull of a watercraft, to capture the planar surface and provide a support surface on which the planar surface may rest and allowing forward, aft, and vertical slidability of the planar surface, thereby forming a fluid-hinge.

2. The system as recited in claim 1, further comprising:
said at least one elongate planar surface further including a proximal actuatable portion at a stern end of said planar surface, said proximal actuatable portion extending from beneath said hull to beyond a transom of the craft.

3. The system as recited in claim 2, further comprising:
an actuator slidably positionable within a vertical containment sleeve, said sleeve is secured to a transom of said watercraft craft, a lower end of said actuator in selectable contact with said proximal portion of said at least one elongate planar surface.

4. The system as recited in claim 3, further comprising:
means for selectably advancing said actuator within said sleeve against said proximal actuatable portion of said planar surface to define a planing angle of said at least one elongate planar surface relative to said one side of said hull of the watercraft to which it is secured.

5. The planar surface as recited in claim 1, further comprising:
said at least one planar surface having a total sum of surface area of all of said at least one planar surfaces of said hydro-lifters of 1%-3% of the product of multiplying the overall length of the hull of the watercraft and the maximum beam of the hull of the watercraft.

6. The planar surface as recited in claim 5, further comprising:
One planar surface, wherein a surface area of said planar surface is in a range from 1% to 3% of the product of multiplying the overall length of the hull of the watercraft and the maximum beam of the hull of the watercraft.

7. The planar surface as recited in claim 5, further comprising:
two planar surfaces, wherein a surface area of each planar surface is in a range from 0.5% to 1.5% of the product of multiplying the overall length of the hull of the watercraft and the maximum beam of the hull of the watercraft.

8. The system as recited in claim 1, in which a range of adjustment of said at least one elongate planar surface relative to the axis of the bottom of the hull of the watercraft exists within a range of about zero to a maximum of about 30 degrees.

9. The system as recited in claim 1, in which said at least one elongate planar surface comprises a rigid material.

10. The system as recited in claim 1, in which said at least one elongate planar surface comprises a flexible material.

11. The system as recited in claim 1, in which said containment shelf-bracket defines a location of between 2 feet and 8 feet forward from the transom.

12. The system as recited in claim 1, in which the at least one elongate planar surface comprises two planar surfaces in which one planar surface is mounted on a port side of a watercraft and one planar surface is mounted on a starboard side of said watercraft.

13. The system as recited in claim 1, further comprising: said planar surface lacking a physically fixation to the at least one containment shelf-bracket wherein the at least one containment shelf-bracket exists without any load from the planar surface other than at rest keeping the planar surface from descending below a plane parallel to a horizon of the hull.

14. The system as recited in claim 13, in which said planar surface provides for forward and aft slidability allowing the planar surface to slide and move with the current system depending on an angle between the planar surface and the hull of said watercraft.

15. The system as recited in claim 14, further comprising:
the at least one containment shelf-bracket having two containment shelf-brackets located at distal ends of a span of the planar surface;
each of the two containment shelf-bracket having a flange mounted to the hull
vertical ears mounted to the flange and extending in a downwardly direction,
a channel with two sidewalls attached to the planar surface and extending in the downwardly direction of the planar surface of the hydro-lifter; and
said vertical ears abutting the inside walls of said channel.

16. The system of claim 15, further comprising:
said vertical ears extending in the downward direction on an angle less than 90 degrees from the containment shelf-bracket that allows the planar surface to rest on the vertical ears.

17. The system of claim 14, further comprising:
the at least one containment shelf-bracket having two containment shelf-bracket located at distal ends of a span of the planar surface;
each of the two containment shelf-bracket having a threaded rod extending downwardly;
said rod extending through the hull and secured to the hull with a nut on the inside of the hull and a nut on the outside of the hull;
said downwardly extending rod curving to bring the rod to a forward-pointing position; and
said forward-pointing position holds the planar surface about parallel to the hull.

18. The system of claim 14, further comprising:
the at least one containment shelf-bracket using a single containment shelf-bracket having a pocket in combination with the hull;
the pocket having a width larger than the span of the planar surface;
the containment shelf-bracket having a flange located at distal ends of the span of the containment shelf-bracket;
the opening of the pocket opening toward the stern;
the pocket contains a lip of the planar surface between a bottom surface of the pocket, the surface of the hull; and
two sidewalls to allow movement but contain the planar surface at low or no speed from descending below the plane parallel to the horizon of the hull.

19. The system of claim 14, further comprising:
the at least one containment shelf-bracket using two brackets mounted to the hull;
each of said containment shelf-bracket having a wall on one side with a mounting flange and an absence of a sidewall on an opposing parallel side;
said absence of a sidewall faces an opposing absence of a sidewall from a complementary containment shelf-bracket;
said containment shelf-bracket occurring at a width slightly larger than distal ends of a span of said planar surface;
said containment shelf-bracket holding the planar surface between a lower flap and the hull; and
the containment shelf-bracket allows the planar surface to move, but the planar surface is unable to slip completely out of the pocket.

20. The system of claim 14, further comprising: the at least one containment shelf-bracket having two containment shelf-bracket located near the distal ends of the span of the planar surface, penetrating the planar surface of the hydro-lifter; said two containment shelf-bracket mounted to the hull; each of the two containment shelf-bracket having a flange mounted to the hull; each of the two containment shelf-bracket having a rod extending downwardly and terminating in an about 90 degree bend; the about 90 degree bend directing the rod to a bow-facing direction in an orientation about parallel to the hull; and the rods contain the planar surface and allowing movement of the planar surface.

21. The system of claim 14, further comprising:
the at least one containment shelf-bracket having two containment shelf-bracket located at the distal ends of the span of the planar surface;
said two containment shelf-bracket mounted to the hull;
each of the two containment shelf-bracket having a flange to be mounted to the hull;
each of the two containment shelf-bracket having a rod extending toward the stern; and
each of the two rods mounted at an angle less than 90 degrees from the hull to contain the planar surface.

22. The system as recited in claim 1, wherein the non-fixed containment area is formed integrally to the hull as to not amount to a containment shelf-bracket separate of said hull.

23. The system as recited in claim 1, wherein the planar surface is configured to exist within a recessed cavern of said hull.

24. The system as recited in claim 23, wherein the lower surface of said planar surface rests substantially flush with the lower surface of said hull when the actuator is not elongated.

25. A method for calculating optimal surface area of the planar surfaces of the hydro-lifters for fuel efficiency, comprising the steps of:
   obtaining the measurement of an overall length of a hull of a watercraft;
   obtaining a measurement of maximum beam of a hull of a watercraft;
   calculating an optimal surface for area for at least one planar surface of at least one hydro-lifter by:
      i. obtaining a first value by multiplying the measurement of overall length of the hull of the watercraft by the maximum beam of the hull of the watercraft; and
      ii. obtaining the optimal surface area for at least one planar surface of at least one hydro-lifter by multiplying the first value by 1-3% and dividing the resulting number by the quantity of planar surfaces.

26. The method as recited in claim 25, further comprising:
   providing at least one system of hydro-lifters with at least one elongate planar surface of a hydro-lifter disposed substantially in parallel with a bow-to-stern axis of a bottom of a hull of a watercraft, at least one actuator mounted to the hull of the watercraft wherein the at least one actuator is pivotally connected at a distal end of said at least one actuator to a rear portion of the planar surface, and at least one containment shelf-bracket fastened to the underside of a hull of a watercraft wherein the at least one containment shelf-bracket forms a non-fixed containment area between an upper surface of containment shelf-bracket and the hull of a watercraft to capture the planar surface and provide a support surface on which the planar surface may rest and allowing forward, aft, and vertical slidability of the planar surface, thereby forming a fluid-hinge; and
   configuring said at least planar surface do dimensions obtained by:
   obtaining the measurement of an overall length of a hull of a watercraft;
   obtaining a measurement of maximum beam of a hull of a watercraft;
   calculating an optimal surface for area for at least one planar surface of at least one hydro-lifter by:
      i. obtaining a first value by multiplying the measurement of overall length of the hull of the watercraft by the maximum beam of the hull of the watercraft; and
      ii. obtaining the optimal surface area for at least one planar surface of at least one hydro-lifter by multiplying the first value by 1-3% and dividing the resulting number by the quantity of planar surfaces.

* * * * *